United States Patent
Odland et al.

(10) Patent No.: US 8,421,811 B2
(45) Date of Patent: Apr. 16, 2013

(54) CUSTOMIZED VEHICLE BODY

(76) Inventors: David Odland, Scottsdale, AZ (US);
Kathryn Odland, Scottsdale, AZ (US)

(*) Notice: Subject to any disclaimer, the term of this patent is extended or adjusted under 35 U.S.C. 154(b) by 674 days.

(21) Appl. No.: 12/559,820

(22) Filed: Sep. 15, 2009

(65) Prior Publication Data

US 2011/0066324 A1    Mar. 17, 2011

(51) Int. Cl.
  *G06F 13/14* (2006.01)
  *G06F 15/16* (2006.01)
  *G09G 5/00* (2006.01)
  *G09G 5/02* (2006.01)

(52) U.S. Cl.
  USPC ........... 345/589; 345/581; 345/619; 345/519; 709/201

(58) Field of Classification Search ............ 345/581, 345/589, 619, 606, 519–520, 547–548; 340/901, 340/990; 709/201; 701/1–2, 102
  See application file for complete search history.

(56) References Cited

U.S. PATENT DOCUMENTS

| | | | |
|---|---|---|---|
| 5,912,653 A | 6/1999 | Fitch | |
| 6,028,537 A * | 2/2000 | Suman et al. | 340/988 |
| 7,065,909 B2 | 6/2006 | Snyder | |
| 7,133,954 B2 | 11/2006 | Yang et al. | |
| 7,413,233 B1 | 8/2008 | Jung | |
| 8,140,358 B1 * | 3/2012 | Ling et al. | 705/4 |
| 2008/0231934 A1 | 9/2008 | Knafou et al. | |
| 2008/0250672 A1 | 10/2008 | Forbes | |
| 2008/0258999 A1 | 10/2008 | Van Doorn | |
| 2009/0251393 A1 | 10/2009 | Fan | |
| 2009/0299857 A1 * | 12/2009 | Brubaker | 705/14.66 |
| 2010/0097239 A1 * | 4/2010 | Campbell et al. | 340/825.25 |

OTHER PUBLICATIONS

Hjerde, Morten, Mobile size screen trend, Apr. 15, 2008 [Online][Retrieved from: http://sender11.typepad.com/sender11/2008/04/mobile-screen-s.html][Retreived on Dec. 12, 2012].

* cited by examiner

*Primary Examiner* — Wesner Sajous

(57) ABSTRACT

This invention relates to a system and method for customizing the appearance of a vehicle. Users can display customized designs, colors or promotional information on the vehicle for free or on a fee basis. The system also allows users to use a detection device to detect the colors or patterns of other objects and then display substantially the same color or pattern on the vehicle.

23 Claims, 12 Drawing Sheets

CUSTOMIZED VEHICLE BODY

FIELD OF THE INVENTION

The present invention generally relates to customizing the look of vehicles to a user's preferences and more particularly to a system for electronically tailoring the look of the vehicle by the user.

BACKGROUND OF THE INVENTION

Customization of products and services allows an individual to personalize an item to reflect a plethora of different moods, preferences, personalities, feelings, information, likes, dislikes, etc. Vehicles are an area in which people are often very particular and their vehicles often serve as a sign of self-expression, style, functionality, individuality and a variety of other purposes. Currently, many vehicle manufactures use internal or external designers to produce new looks for their vehicles. Some even perform marketing trials and tests to determine which styles may sell the best in order to maximize their investments. In order to account for the plethora of different styles, a manufacturer needs to produce a variety of different vehicle styles in order to appease all the different tastes of users. This increases costs to the manufacturer and reduces profitability. In addition, users of the vehicle may not like the majority of vehicle designs that are available and/or may wish that there were style differences to the existing vehicle to better fit their tastes.

In the past, there have been some ways for users to change the look of their vehicle's by adding stickers and painting different portions of the vehicle. These methods of customizing the look of their vehicle can take a long time to complete (in cases such as painting the entire vehicle) as well as being very tiresome of a solution. In addition, the user, if not versed in these types of customizations, may need to hire a professional to complete the customization.

There have been recent developments in display technologies, including by way of example Liquid Crystal Displays (LCDs), Digital Light Projectors (DLPs) and the like. One particular recent display technology is Organic Light Emitting Diode (OLED) technology. OLED displays comprise LED's having an emissive electroluminescent layer that is made up of organic compounds. These OLED displays are low-powered, light-weight, flexible and allow for high-resolution design display. One reason for the reduced power is that OLED displays do not utilize a backlight and the displays can be made very thin (fractions of millimeters thick).

Presently, there is no way for the users or manufacturers of vehicles to customize their vehicles to display different high resolution designs in a quick and easy manner nor is there a way of covering large portions of vehicles with a display. Typical display technologies are rigid and are either square or rectangular in shape.

SUMMARY OF THE INVENTION

The object of the present invention is to provide a system for which vehicles can be used to display design content. The system includes a display, control unit, power unit, input/output unit and memory. This allows the user to customize what is displayed on the vehicle thus altering its appearance.

In one embodiment, the present invention allows a large portion, majority or substantially the entire vehicular surface to display customized designs.

In another embodiment, the present invention can be used to allow the user to identify a color from a detector and then display the vehicle with a color that is substantially the same color as the detected color. This allows the user to match the vehicles appearance to other objects.

The features, functions, and advantages of the present invention can be achieved independently in various embodiments of the present inventions or may be combined in yet other embodiments.

BRIEF DESCRIPTION OF THE FIGURES

The object, features and advantages of the present invention will become more apparent by describing the invention with reference to the accompanying figures, in which.

Corresponding reference characters indicate corresponding parts throughout the drawings. The exemplification set of characters herein is not to be construed as limiting the scope of the invention in any manner.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

1. Definitions

The following terms used throughout the disclosure are defined as follows:

User—Any person, group or entity that uses the system or methods of the present invention.

Vehicle—Any mechanical means for the conveyance or transport of people or other animals including but not limited to cars, trucks, buses, bicycles, motorcycles, trains, ships, boats, aircraft, watercraft, hovercraft, spacecraft, carriages, roadway vehicles, snow vehicles, underwater vehicles and the like.

Content—Any text data, image data, color data, video data, sound data or any combination thereof.

Design—Particular set of content being presented on the display of the vehicle.

Design files—Software files that store data and/or instructions used to define and display the design.

Display—Device or devices for showing pixels representing the design and is located over any area of the vehicle. The display may be a single element or may comprise a plurality of elements making up different sections to cover different parts of the vehicle.

Vehicle Surface—All outwardly exposed surface area of the vehicle that can be seen including by way of example top, bottom, front, back, sides, and the like.

Electronic Computing Device—Any device used for processing data and having one or more processors, program logic, or other substrate configurations representing data and instructions, which operate as described herein. The processor can comprise controller circuitry, processor circuitry, processors, general purpose single-chip or multi-chip microprocessors, digital signal processors, embedded microprocessors, microcontrollers and the like. The devices can including by way of example a personal computer (PC), laptop, netbook, cellular phone, personal digital assistant (PDA), laptop computer, hand held computer, notebook, tablet PC, mobile telephone, Internet server, intranet server, mobile devices or the like.

2. Vehicle

Figure 1A:
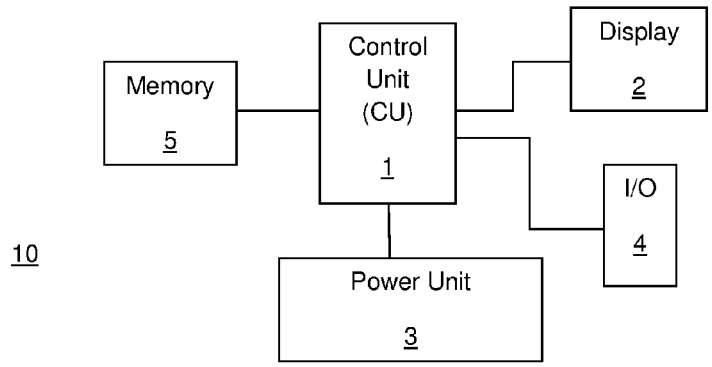
FIG. 1a illustrates a block diagram of the electronic components of the vehicle in accordance with an embodiment of the present invention.

FIG. 1a shows a block diagram of the system 10 of electronic components related to the vehicular display of the present invention. These electronic components include but are not limited to a control unit (CU) 1, display 2, power unit 3, input/output (I/O) unit 4, and memory 5.

The CU 1 of the vehicle may include but is not limited to any processing circuitry used to execute instructions and to control some or all of the other components of the vehicle including the I/O unit 4, memory 5, display 2, power unit 3, and any other electronic components of the system. The CU 1 may comprise both memory and computational portions. The CU 1 can be any circuitry including by way of example: controller circuitry, processor circuitry, processors, general purpose single-chip or multi-chip microprocessors, digital signal processors, embedded microprocessors, microcontrollers and the like.

The power unit 3 of the system may be any power supply including by way of example batteries, solar cells, kinetic, power-over-ethernet (POE), power-over-wi-fi (POWF) or any other known power supply. The power supplies can also come from, where applicable, the vehicle's battery by connecting it directly or indirectly such as through the lighter/power port. In the case of kinetic, the motion and movement of the vehicle can be used to generate power for energizing the display 2 or recharging any battery attached thereto. In addition, the power unit 3 by itself or in conjunction with the CU 1 can be used to implement a power management scheme. The power management scheme may include powering down the display 2 when the vehicle is detected to not be in use or putting the display 2 in a low-power or power saving mode. Power management can also be configured by the user.

The memory 5 is used to store a variety of data including but not limited to any design file the user wishes to display, programs, operating systems, any overhead/processing data and any other data or instructions needed for the system to operate. The memory 5 can include any know memory type including by way of example static-state memory such as static-state-drives (SSD), flash memory, EEPROM, SRAM, DRAM, RAM, or any other memory device that does not require mechanically moving parts that are typically found hard drives. Modern day hard drives typically include moveable parts such as spinning platters/disks, read/write arms/heads and motors. Due to the motion of the vehicle, memory devices having movable parts may be susceptible to errors. Therefore using a solid-state memory device alleviates this problem. In one embodiment, the memory can be integrated within the CU 1 itself and no additional memory circuitry needs to be present in the system. In another embodiment, the memory can be any removable memory including by way of example SD, MMC, Mini SD, Micro SD, T-Flash, MS, M2 or the like. The size of the memory may vary between 64 megabytes through 20 gigabytes or more. FIG. 1c, shows an embodiment wherein the memory 5 is integrated within the CU 1.

The I/O unit 4 may operate using any communication protocol including by way of example any wired or wireless protocol, IEEE 1394, Firewire, Universal Serial Bus (USB) 1.0 or higher, RS-232, Ethernet, Ultrawide Band (UWB), Zigbee, 60 GHz, Wi-fi, 802.11x (where x equals a, b, g, n, or the like), Bluetooth, Radio Frequency (RF), Infrared (IR), cellular telephone, IEEE 802.15.1, CDMA, TDMA, FDMA, wireless, or the like. The communications medium in which these protocols are implemented can be of any type including by way of example dedicated communication lines, telephone networks, wireless data transmission systems, two-way cable systems, customized computer networks, interactive kiosk networks, automatic teller machine networks, interactive television networks, and the like. In another embodiment, the I/O unit 4 may also be integrated within the CU 1 itself, as shown in FIG. 1d.

The display 2 is any device that can produce a large number of pixels in order to display high resolution images or video. The display of the present invention may be of a single display or multiple displays that cover one or more portions of the vehicle surface. The present invention is capable of supporting a plethora of resolutions in the range of about 50 pixels to 2 million pixels or more. In one embodiment the display can display about 500,000-1,000,000 pixels or more and multiple displays used when a large portion of the vehicle surface is to be covered. In another embodiment, when the majority or substantially the entire vehicle surface is covered, the display can display about 2,000,000 or more pixels. One important aspect of the invention is that the display 2 can be used over a large portion, a majority or substantially the entire vehicle surface. The resolution or number of pixels in the display 2 will depend on a number of factors including by way of example the vehicle surface area covered by the display, the native resolution of the display, the shape of the vehicle, the user's desired resolution, the resolution of content in the design files to be displayed or any combination thereof. The native resolution is a parameter that indicates how many pixels the display actually has. If a user chooses a resolution that is different than the native resolution then the resolution will be converted or scaled to fit the native resolution. The size and shape of the display of the present invention will be indicative of the native resolution and will vary depending on the vehicle type, size and vehicle surface to be covered. The user can adjust the resolution of the design file being displayed so that it is higher or lower than the native resolution and the control unit will adaptively drive the display by converting or scaling to image with respect to the native resolution. For example, if display 2 has a native resolution of about 1 million pixels and the user wishes to display an image of the design file having about 500,000 pixels the CU 1 may up-convert the image to be displayed on the 1 million pixel display. The user may want to adjust the resolution to best match the particular resolution of an image in the design file to the native resolution of the display in order to get the best quality. For example, if the display or number of displays covers substantially the entire vehicle surface and each has a native resolution of about 2 million pixels then the user may want to up-convert or down-convert the resolution to best display a particular image on the display. The system is flexible in what resolutions it can displayed and this resolution can be chosen by the user. In one embodiment, the surface area covered by the display 2 is greater than about 25% of the entire vehicle surface. In another embodiment the surface area of the display 2 is between about 40% and 80% of the entire vehicle surface. In another embodiment the display 2 may also cover up to substantially the entire vehicle surface. The display 2 may be made of any known thin film display and will be covered by a coating or other protection methods known in the art to protect the display from weather, temperature, water, scratching and impact damage. In one embodiment, the display 2 may comprise any LED display including by way of example Organic Light Emitting Diode/Device/Display (OLED), Active Matrix Organic Light Emitting Diode (AMOLED), FOLED (Flexible Organic Light Emitting Diode), PhOLED (Phosphorescent Organic Light Emitting Diode, PLED (Polymer Light Emitting Diode, PMOLED (Passive Matrix OLED), POLED (Polymer Organic Light Emitting Diode), RCOLED (Resonant Color Organic Light Emitting Diode), SmOLED (Small Molecule Organic Light Emitting Diode, SOLED (Stacked Organic Light Emitting Diode), TOLED (Transparent Organic Light Emitting Diode), NOID (Neon Organic Iodine Diode) or the like. The display or displays of the present invention are such that they are flexible and can substantially fit the exact contour of a vehicle body no matter what the shape of the body. Typical displays are usually square or rectangular in shape, have a thickness greater than one inch and are rigid. The current invention on the other hand utilizes a display that is extremely thin and flexible so it can contour to a large portion of or the entire body of the vehicle.

According to FIG. 1*a*, the user transfers design files using the I/O unit 4 and the files are stored in memory 5. The CU 1 executes a program that uses the design files stored in memory 5 in order to generate the content that will be shown on the display 2. The power unit 3 provides the power needed for each block to operate and may have an associated power management scheme.

Figure 1B:
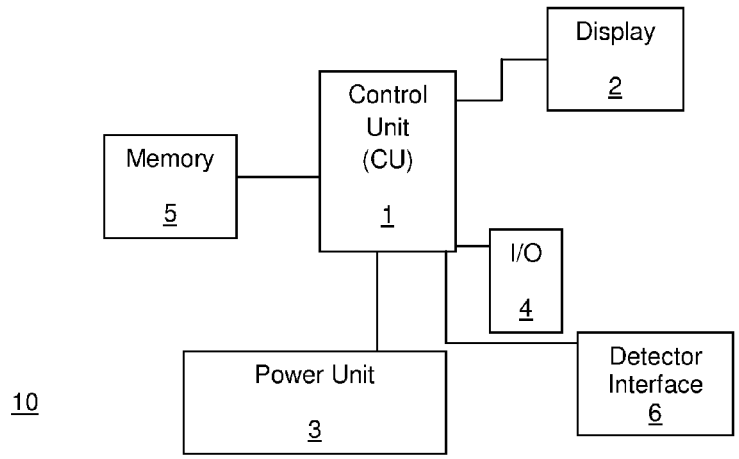
FIG. 1b illustrates an alternate block diagram of the electronic components of the vehicle and includes a color detector interface in accordance with an embodiment of the present invention.
Figure 1C:
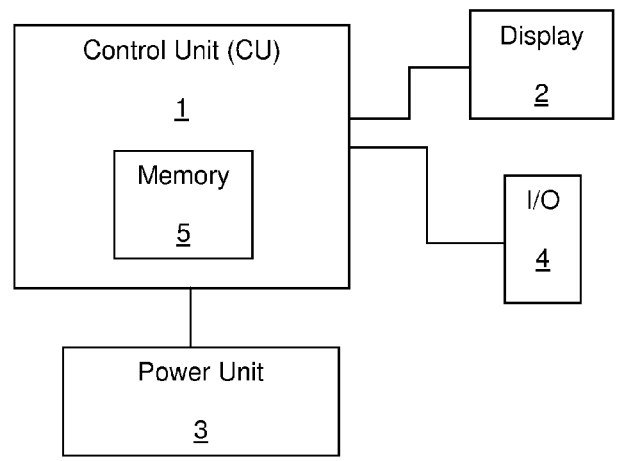
FIG. 1c illustrates an alternate block diagram of the electronic components of the vehicle and includes integrated memory in accordance with an embodiment of the present invention.
Figure 1D:
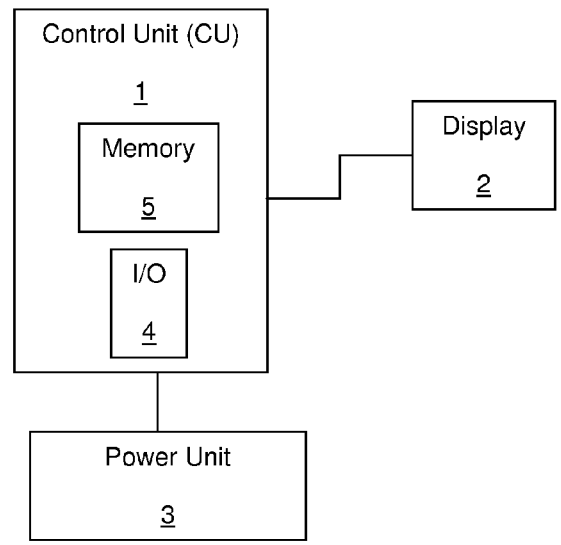
FIG. 1d illustrates an alternate block diagram of the electronic components of the vehicle and includes both integrated memory and an integrated input/output unit in accordance with an embodiment of the present invention.

FIG. 1*b* shows the electronic configuration of FIG. 1*a* with the added component of the detector interface 6. The detector is discussed below.

Some or all of the electronic components 1-6 may be integrated with the vehicle itself, mounted on any surface of the vehicle or may be located at a distance but communicatively coupled to the vehicle. For electronic components of system 10 that are integrated within the vehicle they may be hidden within any part of the vehicle including by way of example the interior pockets, between panels or any other part of the vehicle or combination thereof. In addition, all electronic components may be protected with moisture and temperature proofing techniques known in the art.

Figure 2A:
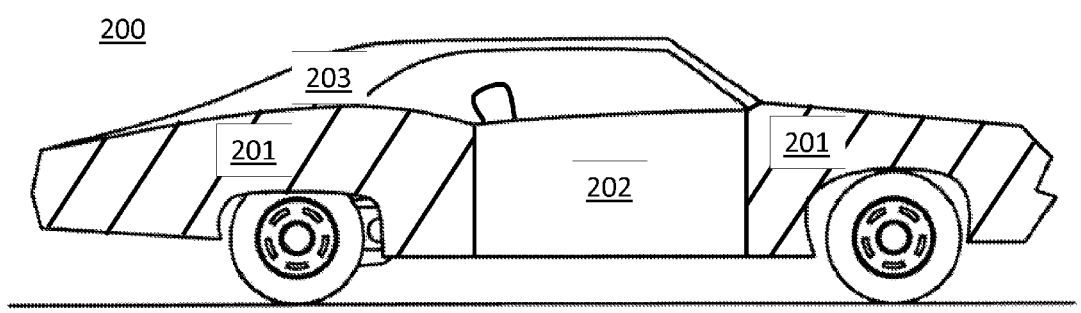
FIG. 2a illustrates a vehicle of the present invention wherein the display covers a certain portion of the vehicle's surface area in accordance with an embodiment of the present invention.
Figure 2B:
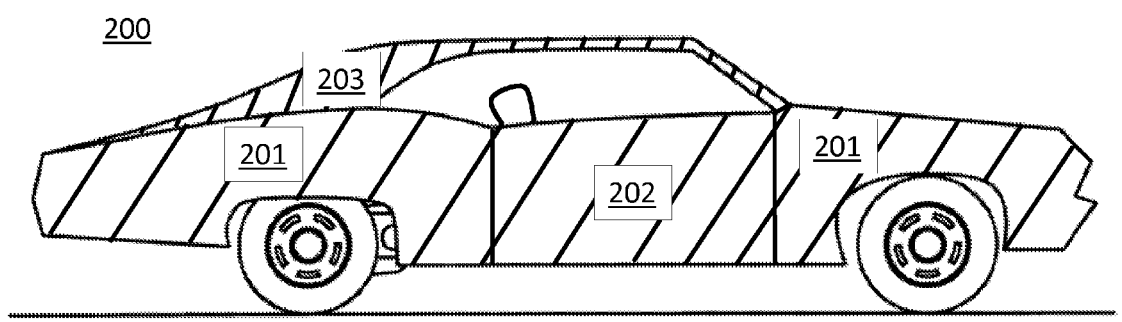
FIG. 2b illustrates alternate vehicle of the present invention wherein the display covers a larger portion of the vehicle's surface area in accordance with an embodiment of the present invention.

FIGS. 2*a* and 2*b* show two exemplary configurations of the present invention. FIG. 2*a* shows vehicle 200 having a plurality of sections 201-203. In this configuration the display of the present invention would cover the surface area denoted by the diagonal lines of section 201 (rear and front side panels). Sections 202 (door) and 203 (roof) do not include the display. The high-resolution design file would generate content that covers the entire section 201. FIG. 2*b* shows another configuration wherein the display also covers the areas denoted by 201, 202 and 203. The user can customize the design displayed in any or all of these sections. The design areas cover a large portion of the surface of the vehicle. In the configuration of FIG. 2*b*, areas 201-203 may be the same display image or may display different display images. In addition, in the configuration of FIG. 2*b*, areas 201-203 may be of a single display or multiple displays.

The display or displays covering the areas 201-203 are such that they are flexible and can fit the contour of a vehicle body no matter what the shape of the vehicle's body.

3. Designs

Designs that are to be displayed by the vehicle can be created by the users of the vehicle themselves using any existing software program including for example Adobe Photoshop, Adobe Illustrator, Microsoft Paint, or the like. Additionally, the user may use proprietary software program that is provided or associated with the present invention. This proprietary software program may be provided to the user using any form of software delivery including for example hard copy, compact disc (CD), flash drive, downloadable form, Internet based, or the like. Further, the software program may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data databases, data structures, tables, arrays, variables, or the like.

The user may also obtain designs from the Internet for free and/or for a fee basis. Internet designs may be created by the user using either a desktop-based interface or a web-based interface and transferred to a web server for later retrieval or the designs can be created by other users and downloaded by the current user from the other users. The software used for the design may be located on any electronic computing device. The software may also be located at and executed using the vehicle itself. As mentioned earlier, the designs can be completely customized to display high-resolution images, high-resolution video and/or large color depth pixels representing a single or variety of colors or patterns. In one embodiment, the design can be video and the display frequency can range from about 15 frames-per-second to about 120 frames-per-second or about 15 Hz to about 120 Hz. In another embodiment the display frequency is 60 frames-per-second or 60 Hz. In one embodiment the color depth is between about 8-bits and 48-bits. This range will allow the user to select or detect a large gamut of colors. In another embodiment the color depth is 24-bits which would provide true color which is able to produce over 16.7 million distinct colors. Of the 24-bits in true color, 8 bits represent red, another 8 bits represent green and the last 8 bits represent blue. In another embodiment the color depth may be 36 bits or 48 bits or more which will allow the user to display high-end graphics.

In another embodiment, a user may wish to have some or all of the pixel colors match substantially the same color as another object. For instance, if the vehicle's interior seating is of a certain shade of gray, then the user might want some or all of the pixels to be substantially the same color. The user selects a color that is substantially the same as the color of the interior seating using software by choosing colors or color coordinates/values from a large collection of different colors already stored in the software application. In addition, the present invention also includes a color detector that can automatically detect the color of the interior and automatically determine the corresponding color coordinates/values. The color coordinates/values may be any known color coordinates including for example RGB, HTML Hex, YBR or the like. Based on the determined color coordinates the design to be displayed may include all or some of the pixels having the same color coordinates or at a desired different shade of the color coordinates, thereby providing substantially the same color in the display as the vehicle interior. In one embodiment, 'substantially the same color' refers to a color that is so closely identical to the color of the interior such that a human eye cannot easily tell the difference in the color or 'substantially the same color' may also refer to a color wherein the human eye can see a difference but the color difference is negligible, acceptable or actually wanted by the user. Thus, the user can match the color being displayed by the vehicle display to any other part of the vehicle or other object. The user can also select to have the detected color displayed in substantially all the pixels of the display or a portion thereof. Other objects the detector can be used to detect the color of include different vehicle parts in cases where the user wishes to match the vehicle color to these parts. The colors may also want to match to a certain color scheme dependent on what the driver/user is wearing. For example, if the user is a race car driver who has a certain color scheme, the pixels displayed can be set to match the color scheme of the driver. Another example, is an emergency or government vehicle, such as a police car where the colors associated with the police department can be set. Since the pattern of the display can change the actual body of emergency or government vehicles can also be programmed to flash thus making them more visible when driving in cases of emergencies. The detector can also detect patterns and/or multiple colors thereby allowing the vehicle to match the pattern of another object. Further, a user can use the detected colors from the detector to create a pattern or other image to be displayed on the vehicle. Another application of the present invention may be for military vehicles that operate in different geographical environments, thereby requiring different camouflage colors. The present invention would allow military personnel to use the same vehicle for each of those different environments by just changing the displayed pattern.

Figure 3A:
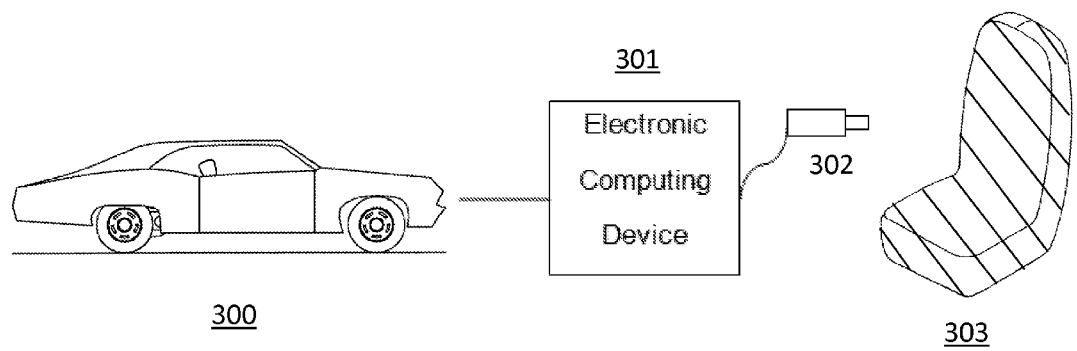
FIG. 3a illustrates a configuration for using a color detection device with the vehicle in accordance with an embodiment of the present invention.
Figure 3B:
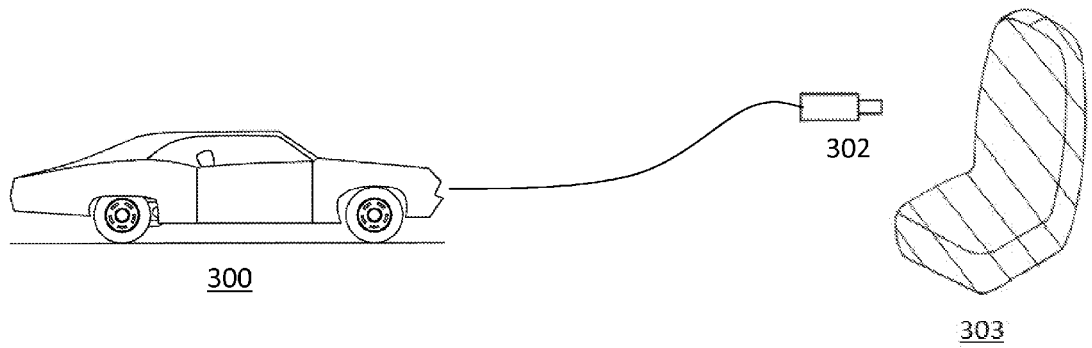
FIG. 3b illustrates an alternate configuration for using a color detection device with the vehicle in accordance with an embodiment of the present invention.

FIGS. 3a & 3b show the use of the color detector feature of the present invention. FIG. 3a includes the vehicle 300 with the display of the present invention coupled to an electronic computing device 301. In this configuration, the electronic computing device 301 stores and executes a program that determines the color of interior seat 303. The user uses a color detection device 302 to sense the color of the interior 303. The color values are processed by electronic computing device 301 to determine color values that represent substantially the same color as that of the interior seat 303 and these values are sent to the vehicle 300 in a design file. The vehicle 300 uses this design file to generate pixel colors that have substantially the same color as the colors of the interior 303. FIG. 3b, shows a configuration wherein the color detection device 302 is coupled directly to the vehicle 300, using the I/O unit and without any intervening electronic computing device. In this configuration, the control unit of the vehicle 300 stores and executing the program used to determine the color values of the interior seat 303. The control unit would then create the design file itself and execute the program to display pixels colors that are substantially the same color as the interior seat 303. In addition, from FIG. 3b, the user can transfer the design files made using the color detection device 302 and the control unit to a different electronic computing device for further editing of the design by the user. After redesigning the design files the user can transfer them back to the vehicle and/or share them with other users for free or for a fee.

In another embodiment, the designs of the present invention can be used for sales and marketing promotions. Since the present invention allows for high-resolution images, video and/or audio, the user can display by way of example a logo, company name, advertisement or any other promotional content of a company or other organization in the display. One application may be for a user that is race car driver wherein their vehicle may be viewed by a large number of people watching a race. The user can agree to display the promotional content for free or for a fee. The design process can allow for the display to remain for any amount of time and may consist of a single promotion, multiple promotions simultaneously, multiple promotions sequentially, and any combination thereof. The fee structure may include any fee structure known in the art including but not limited to pay-per-display, pay-per-minute or auction-based.

Figure 4:
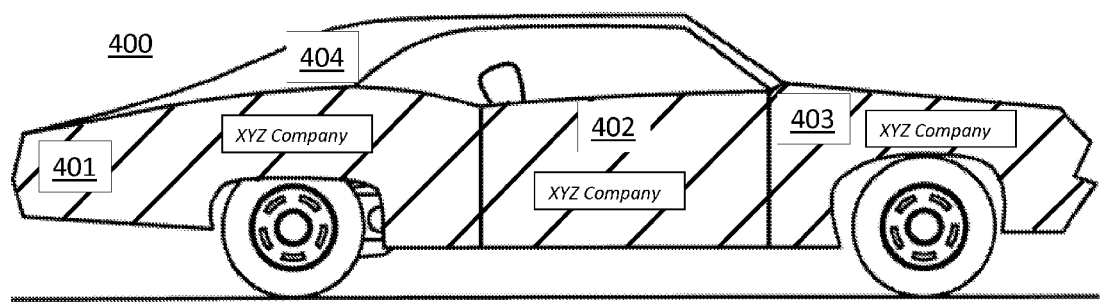
FIG. 4 illustrates a configuration of using the display to show promotional content in accordance with an embodiment of the present invention.

FIG. 4 shows vehicle 400 of the present invention wherein the vehicle is used to display promotional material for a company, 'XYZ Company'. In this configuration, the display fills the surface area of the vehicle in sections 401 (rear side panel), 402 (door) and 403 (front side panel) and displays the company's name. Alternatively, the remaining section 404 (roof) may also be covered by the display and show the company name or any additional content. Additionally, any other exposed part of the vehicle can be used to display the content including by way of example, the hood, trunk and sidewalls of the wheels.

Figure 5A:
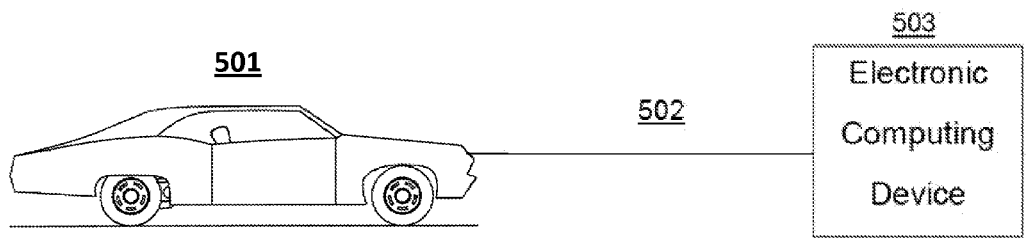
FIG. 5a illustrates a configuration for transferring design files to and from the vehicle in accordance with an embodiment of the present invention.
Figure 5B:
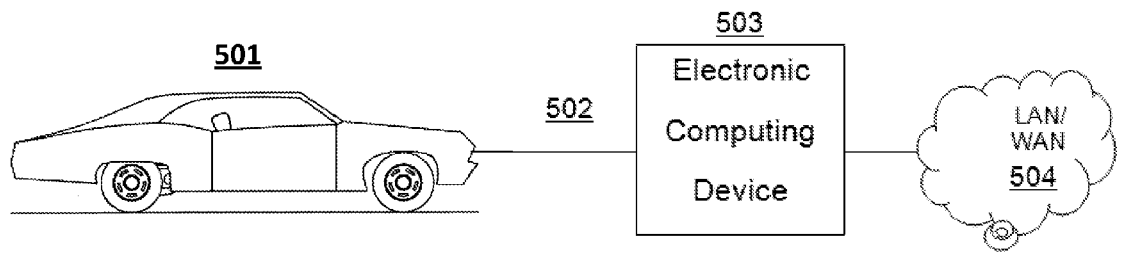
FIG. 5b illustrates an alternate configuration for transferring design files to and from the vehicle in accordance with an embodiment of the present invention.
Figure 5C:
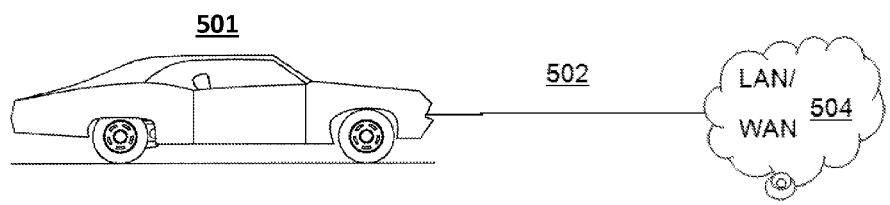
FIG. 5c illustrates an alternate configuration for transferring design files to and from the vehicle in accordance with an embodiment of the present invention.
Figure 5D:
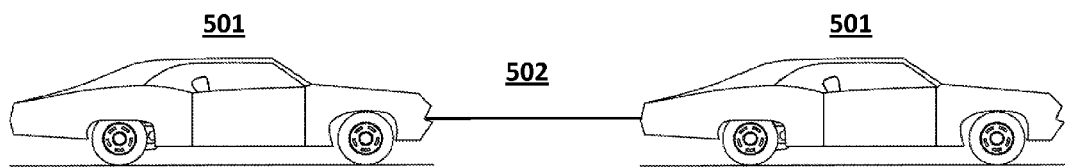
FIG. 5d illustrates an alternate configuration for transferring design files to and from the vehicle in accordance with an embodiment of the present invention.

FIGS. 5a-5d show different configurations for communicating design files and any other data to and from the vehicle for display. FIG. 5a shows a configuration wherein the vehicle 501 is coupled to an electronic computing device 503 and the user transfers the design files already stored on the electronic computing device 503 to the vehicle using interconnect 502. Interconnect 502 is connected to the I/O unit of the vehicle 501 and may communicate using any wired or wireless protocol including but is not limited to IEEE 1394, Firewire, Universal Serial Bus (USB) 1.0 or higher, RS-232, Ethernet, Ultrawide Band (UWB), Zigbee, 60 GHz, Wi-fi, 802.11x (where x equals a, b, g, n, etc.), PSTN, Bluetooth, Radio Frequency (RF), Infrared (IR), cellular telephone, IEEE 802.15.1, CDMA, TDMA, FDMA, wireless, or any other proprietary or non-proprietary communication protocol. FIG. 5b shows a configuration wherein the user first transfers the design files from a LAN/WAN 504, such as the Internet or some other network, to the electronic computing device 503 and then transfers the design files from the electronic computing device 503 to the vehicle 501. FIG. 5c shows a configuration wherein the design files are directly transferred from the LAN/WAN 504 to the vehicle 501. FIG. 5d, shows a configuration wherein designs are communicated directly between two different vehicles 501. In the case shown in FIG. 5d, each of the two vehicles 501 may be owned by the same user or a different user, thus allowing for sharing of designs.

Sharing designs amongst users can be beneficial in that if one user likes the design of another user, then each of the users can communicate one or more design files directly between their vehicle without the need of any intervening network or electronic computing device. This can be done using the I/O units of each vehicle. The user can select to immediately display the communicated one or more design files or save it in the vehicle to display later or transfer the saved one or more design files to an electronic computing device at a later time. The present invention may also include actuators located on the vehicle to commence design file transfer between vehicles, any electronic computing device or any WAN/LAN, wherein the actuators may includes any actuator including by way of example soft keys, touch screen, hard keys, a remote/handheld control or the like. Alternatively, commencement of the design file transfer may take place automatically or without any intervention by the user. Additionally, commencement of the file transfer may also take place through the use of a user interface of an electronic computing device that is in communication with the user's vehicle, thus providing an interface for entering design file transfer commands. The interface is any interface including by example voice activated commands, Graphical User Interface (GUI), menus and the like. Commencement of the design file transfer can take place using the electronic computing device.

The display of the designs can also be altered in a plurality of ways. The display can be programmed to display different designs according to any different number of metrics or combinations of metrics including by way of example different times of day, cyclically at a particular rate, different temperatures, the level of light in the surrounding environment or the like.

Although the above descriptions include having the electronic components of the system integrated with the vehicle, the system can also be implemented as a retrofit solution wherein the user has an existing vehicle and wishes to add the customization aspect of the present invention. In this instance, the user will attach the display to the existing vehicle along with the corresponding electronic components.

Figure 6A:
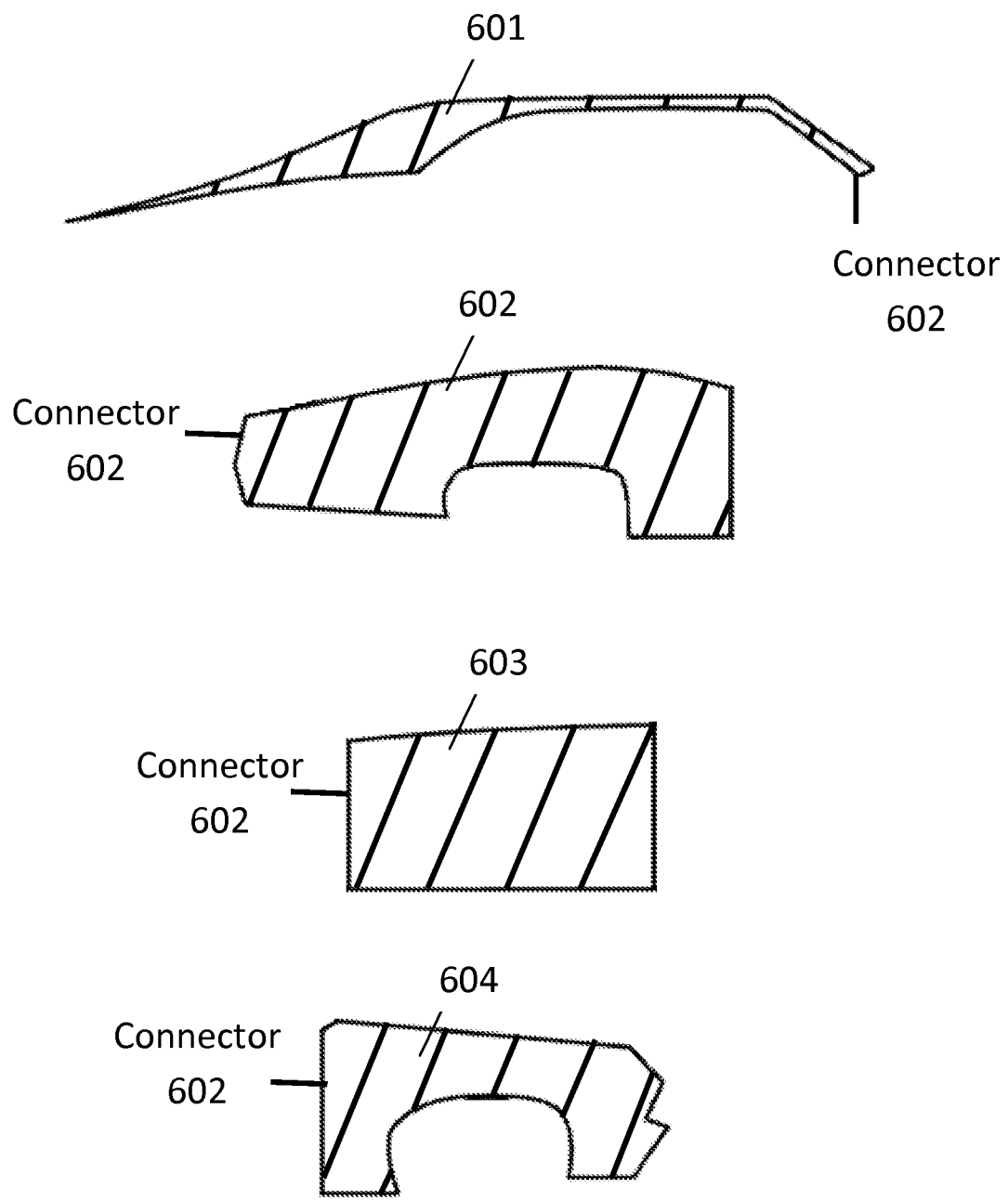
FIG. 6a illustrates an outer view of a retrofitting version of the invention in accordance with an embodiment of the present invention.
Figure 6B:
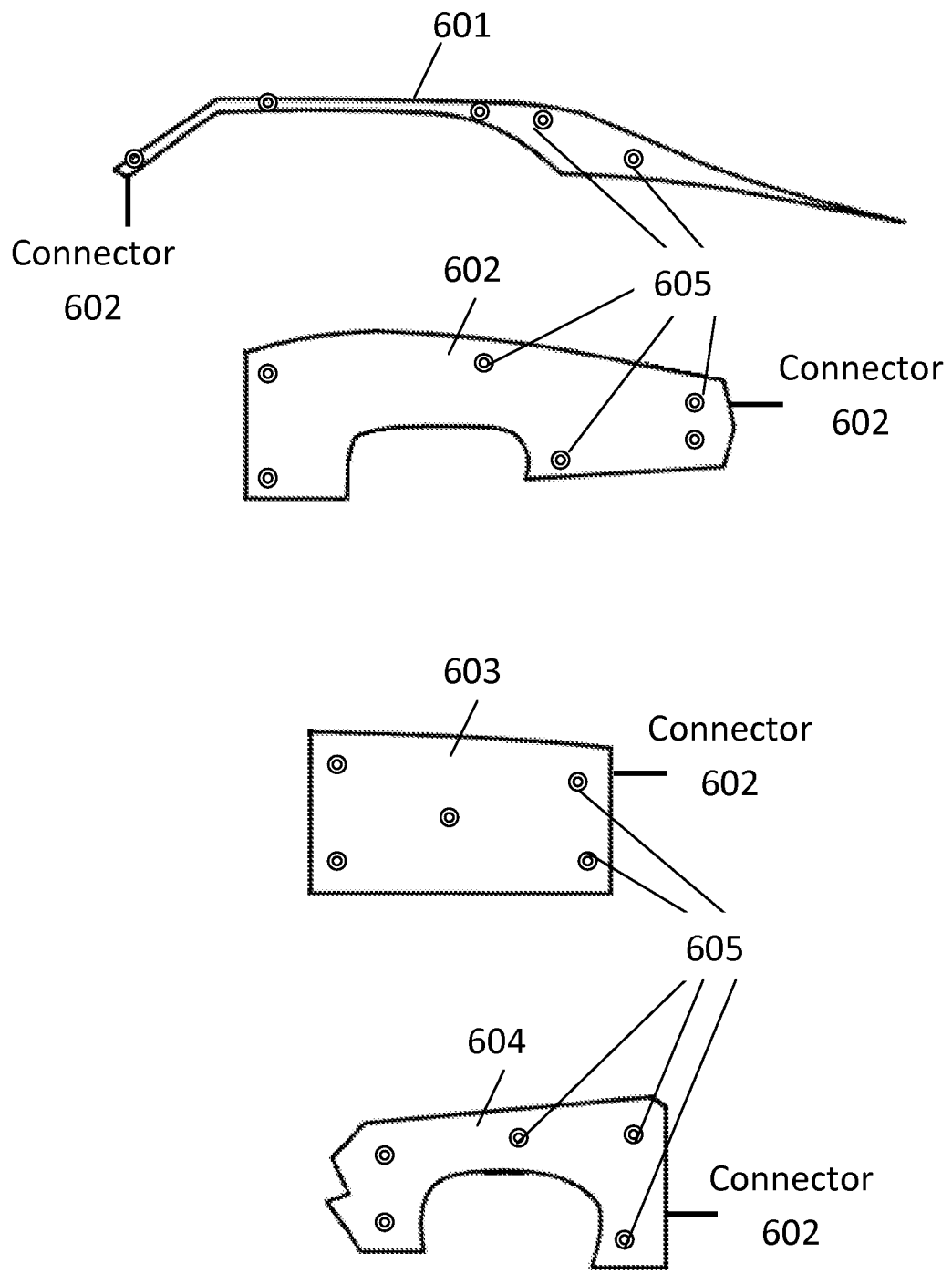
FIG. 6b illustrates a rear/inward view of a retrofitting version of the display in accordance with an embodiment of the present invention.

FIGS. 6a and 6b show a retrofit solution provided by the present invention. FIG. 6a shows a front view of different displays corresponding to different sections of the vehicle shown in FIG. 2a. Display 601 corresponding to a roof section, display 602 corresponding to a rear side panel section, display 603 corresponding to a door section and display 604 corresponds to a front side panel section. The front of the displays 601-604 are located toward the front or outer portion of the vehicle and is visible to a user or anyone looking toward the vehicle. Since the displays 601-604 are made of flexible material the user can attach or wrap the displays 601-604 around the existing vehicle so that the display substantially fits the contour of the vehicle sections. FIG. 6b shows a rear view or a view when the displays 601-604 are flipped over exposing the back side of the displays 601-604 of FIG. 6a. The back sides of displays 601-604 include attachment means 605 that are used to attach the displays 601-604 to the existing vehicle. Attaching means 605 can be any means for attaching the displays to the existing vehicle including by way of example Velcro©, snapping buttons, tongue & groove, glue, tape, adhesive, stitching or any other known means. FIGS. 6a & 6b also include connector 602. Connector 602 couples the displays 601-604 to a control unit so that is can receive the signals to display the designs. The user uses a module containing the electronic components of the system such as those described in FIGS. 1a-1d and connects the module to the display using connector 602. The electronics for the retrofit embodiment can be housing anywhere within the vehicle or held by the user. When connected, the displays 601-604 and electronic components operate in the same fashion as described in the other embodiments of the present invention.

Figure 7:
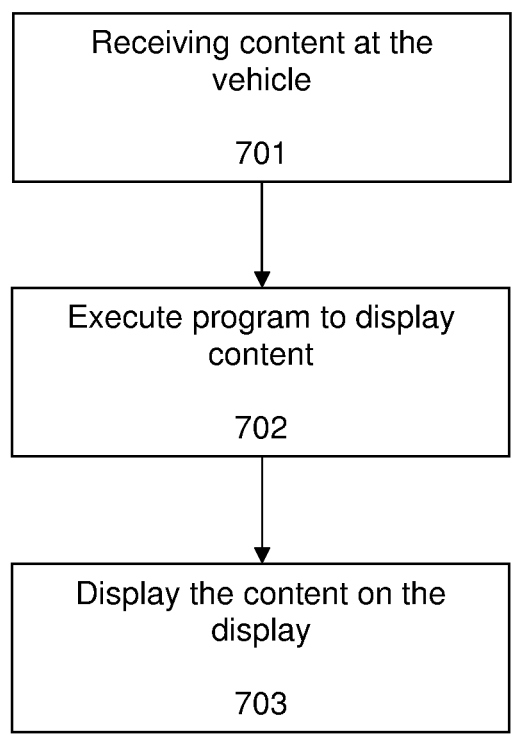
FIG. 7 illustrates a flow diagram of operations performed by one embodiment of the present invention.

FIG. 7 demonstrates operations performed in accordance with the present invention. In operation 701 the I/O unit of the vehicle receives content that is to be displayed. In operation 702 the CU executes instructions (program) to display the content. In operation 703 the display in communication with the CU shows the content.

Figure 8:
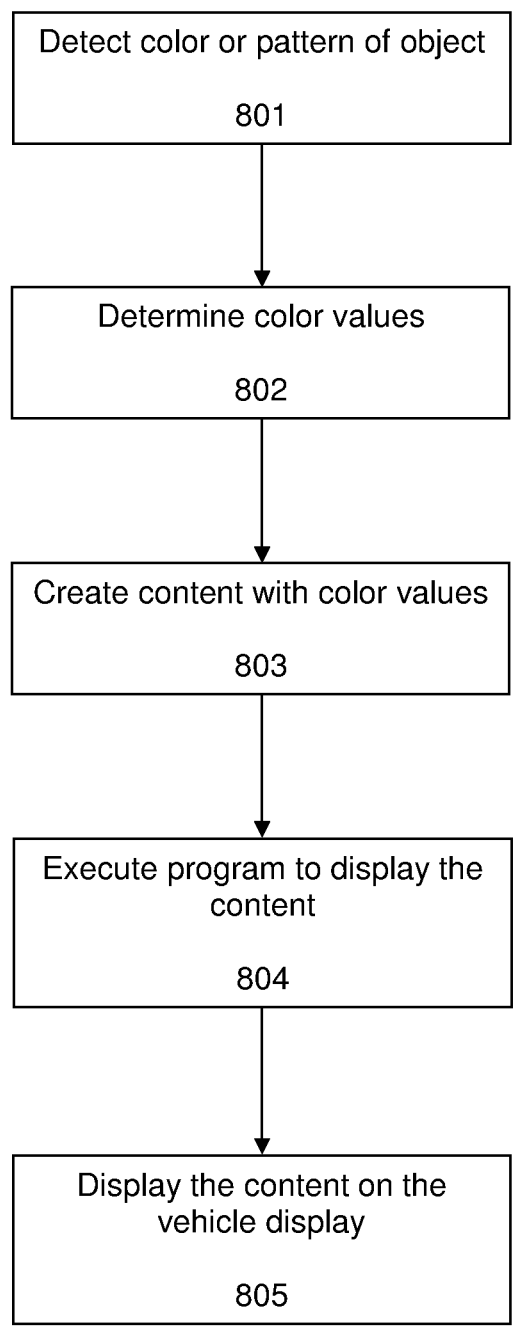
FIG. 8 illustrates a flow diagram of operations performed by another embodiment of the present invention.

FIG. 8 also demonstrates operations performed using a color detector in accordance with the present invention. In operation 801, detection of a color or pattern of an object is made by the user or a detector device. In operation 802 a determination of the color values of the object are made. This determination can be made by the user visually inspecting the object and choosing a color from a color gamut presented to the user in the software application or the user can use a detector that can automatically detect and determine the color values. Based on the detection a color that is substantially the same color as the object is determined. In operation 803 the content is created wherein some or all of the pixels use the detected color or pattern. In operation 804, the CU executes a program to display the content on the display of the vehicle. In operation 805 the display, being in communication with the CU, shows the content.

Although specific embodiments of the present invention have been illustrated and described herein, it will be appreciated by those of ordinary skill in the art that any arrangement which is calculated to achieve the same purpose may be substituted for the specific embodiments shown. In addition, although the above invention is demonstrated as a software based implementation, the invention could be implemented as software, hardware, or any combination foreseeable to one of ordinary skill in the art. This application is intended to cover any adaptations or variations within the spirit of the invention.

What is claimed is:

1. A method for displaying customized content on at least one vehicle having a surface, comprising:
   a. Detecting the color of an object using a detector;
   b. Determining color values related to the object;
   c. Using the color values to create the content;
   d. Executing a program by a control unit of the vehicle; and
   e. Displaying the content based on the program executed by the control unit of the vehicle.

2. The method of claim 1, wherein the content also consists of at least one of the following: text data, image data, color data, video data, sound data or any combination thereof.

3. The method of claim 1, wherein the customized content is designed using a software program.

4. The method of claim 1, wherein the display consists of one of the following:

Organic Light Emitting Diode/Device/Display (OLED), Active Matrix Organic Light Emitting Diode (AMOLED), FOLED (Flexible Organic Light Emitting Diode), PhOLED (Phosphorescent Organic Light Emitting Diode, PLED (Polymer Light Emitting Diode, PMOLED (Passive Matrix OLED), POLED (Polymer Organic Light Emitting Diode), RCOLED (Resonant Color Organic Light Emitting Diode), SmOLED (Small Molecule Organic Light Emitting Diode, SOLED (Stacked Organic Light Emitting Diode), TOLED (Transparent Organic Light Emitting Diode) and NOID (Neon Organic Iodine Diode).

5. The method of claim 1, wherein the content is designed at least partially by a user of the vehicle.

6. The method of claim 1, wherein content is at least partially downloaded from the Internet.

7. The method of claim 1, wherein the step of displaying further comprises displaying the content on 40% or more of the vehicle surface.

8. A computer-readable medium encoding a computer program product, operable to cause a data processing system to perform operations comprising:
   a. Detecting the color of an object using a detector;
   b. Determining color values related to the object;
   c. Using the color values to create the content; and
   d. Executing a program by a control unit of the vehicle; and
   e. Displaying the content on a surface of the vehicle based on the program executed by the control unit of the vehicle.

9. The computer readable medium of claim 8, wherein the operations of the data processing system and the control unit of the vehicle are performed using any one of the following: a desktop PC, laptop PC, netbook, notebook, tablet PC, PDA, mobile telephone, Internet server, Intranet server and mobile device.

10. The computer readable medium of claim 8, wherein the operations of the data processing system and the control unit of the vehicle are performed on the same device.

11. The computer readable medium of claim 8, wherein the content also consists of at least one of the following: text data, image data, color data, video data, sound data or any combination thereof.

12. The computer readable medium of claim 8, wherein the customized content is designed using a software program.

13. The computer readable medium of claim 8, wherein the display consists of one of the following: Organic Light Emitting Diode/Device/Display (OLED), Active Matrix Organic Light Emitting Diode (AMOLED), FOLED (Flexible Organic Light Emitting Diode), PhOLED (Phosphorescent Organic Light Emitting Diode, PLED (Polymer Light Emitting Diode, PMOLED (Passive Matrix OLED), POLED (Polymer Organic Light Emitting Diode), RCOLED (Resonant Color Organic Light Emitting Diode), SmOLED (Small Molecule Organic Light Emitting Diode, SOLED (Stacked Organic Light Emitting Diode), TOLED (Transparent Organic Light Emitting Diode) and NOID (Neon Organic Iodine Diode).

14. The computer readable medium of claim 8, wherein the content is designed at least partially by a user of the vehicle.

15. The computer readable medium of claim 8, wherein content is at least partially downloaded from the Internet.

16. The computer readable medium of claim 8, wherein the step of displaying further comprises displaying the content on 40% or more of the vehicle surface.

17. A system for displaying customized content on at least one vehicle having a surface, comprising:
   a. Detecting the color of an object using a detector;
   b. Determining color values related to the object;
   c. Using the color values to create the content;
   d. Executing a program by a control unit of the vehicle; and
   e. Displaying the content based on the program executed by the control unit of the vehicle.

18. The system of claim 17, wherein the content consists of at least one of the following: text data, image data, color data, video data, sound data or any combination thereof.

19. The system of claim 17, wherein the content is designed using a software program.

20. The system of claim 17, wherein the display consists of one of the following:

Organic Light Emitting Diode/Device/Display (OLED), Active Matrix Organic Light Emitting Diode (AMOLED), FOLED (Flexible Organic Light Emitting Diode), PhOLED (Phosphorescent Organic Light Emitting Diode, PLED (Polymer Light Emitting Diode, PMOLED (Passive Matrix OLED), POLED (Polymer Organic Light Emitting Diode), RCOLED (Resonant Color Organic Light Emitting Diode), SmOLED (Small Molecule Organic Light Emitting Diode, SOLED (Stacked Organic Light Emitting Diode), TOLED (Transparent Organic Light Emitting Diode) and NOID (Neon Organic Iodine Diode).

21. The system of claim 17, wherein the content is designed at least partially by a user of the vehicle.

22. The system of claim 17, wherein content is at least partially downloaded from the Internet.

23. The system of claim 17, wherein the step of displaying further comprises displaying the content on 40% or more of the vehicle surface.

* * * * *